United States Patent [19]

Hutson

[11] Patent Number: 5,175,710
[45] Date of Patent: Dec. 29, 1992

[54] MULTI-DIMENSIONAL DATA PROCESSING AND DISPLAY

[76] Inventor: William H. Hutson, 47 Grange Ave., P.O. Box 0221, Little Compton, R.I. 02837

[21] Appl. No.: 628,337

[22] Filed: Dec. 14, 1990

[51] Int. Cl.⁵ .............................................. H04B 1/06
[52] U.S. Cl. .................................................. 367/135
[58] Field of Search .......................... 367/135; 364/517

[56] References Cited

U.S. PATENT DOCUMENTS 3,894,348 7/1975 Fontaine ............................ 340/728
4,736,199 4/1988 Chadwick et al. ...................... 434/9

OTHER PUBLICATIONS

Schmidt, "Multiple Emitter Location and Signal Parameter Estimation", Mar. 1986.
Carroll et al., "Models and Methods for Three-way Multidimensional Scaling", 1974.
Owsley, "Enhanced Minimum Variance Beamforming", Nov. 1988.
Marple, "Digital Spectral Analysis", 1987.
Kung, "Warp Demo", Aug. 1986.

Comon, "An Array Processing Technique Using the First Principal Component", 1988.

Primary Examiner—Daniel T. Pihulic
Attorney, Agent, or Firm—Hale and Dorr

[57] ABSTRACT

A multi-dimensional processing and display system is used with a sonar tracking system to monitor ocean-going vessels. The system arranges data in a three-dimensional matrix, which is then reformatted into a two-dimensional matrix. The two-dimensional matrix is decomposed into singular vectors and singular values. Certain data elements in the two-dimensional matrix are enhanced or diminished by modifying selected angular values. A history database is maintained by saving certain of the singular vectors, which is concatenated with the two-dimensional matrix. An enhanced two-dimensional matrix is generated by multiplying the two-dimensional concatenated matrix by the modified singular values and the singular vectors. After data enhancement, the two-dimensional enhanced matrix is reformatted back into a three-dimensional matrix. All or portions of the enhanced three-dimensional matrix can then be displayed.

33 Claims, 16 Drawing Sheets

AT TIME t0
AT FREQUENCY f1

AT TIME t0

FIG. 7A  BTR MATRIX DECOMPOSITION

OPERATOR INTERFACE DISPLAYS

FIVE DIMENTIONAL DATA PROCESSING,
INCLUDING A TWO DIMENTIONAL ARRAY OF DATA CUBES,
$X_{11}, X_{12}, X_{13}$
$X_{21}, X_{22}, X_{23}$

MULTI-DIMENSIONAL DATA PROCESSING AND DISPLAY

BACKGROUND OF THE INVENTION

The invention relates in general to data processing systems for real-time, multi-dimensional analysis and display. More particularly, the invention is directed to a real-time processing system that processes multi-dimensional signals received from a passive acoustic surveillance system.

Prior art monitoring systems typically receive data from a beamformer and an array of hydrophones which are dragged behind, or mounted on, a vessel. The data received from the beamformer is the amplitude of the acoustic energy, within a frequency band, at a specified angle (or "bearing"), and at a discrete time interval.

Various techniques are currently used to process this data to detect and track submarines. Although the data inherently is three-dimensional, having correlative values for frequency, time and bearing, known systems analyze the data in two dimensions only, and therefore must sacrifice data analysis in one of these dimensions.

Some prior art systems perform data calculations on data in a "LOFAR" format. LOFAR data is the amplitude of the data received at a particular bearing in a time by frequency format. These prior art systems therefore can analyze data from only one direction, or bearing, at a single time, and cannot correlate data across several bearings while maintaining the bearing data separately.

Other prior art systems arrange the same data in a "FRAZ" format, or a frequency by azimuth matrix. This allows data processing of data from all directions for a particular frequency range, but only for one particular time interval. Additional prior art systems arrange the data in a "BTR", or bearing by time format. This allows data processing of data from many directions over time, but only for a limited frequency band or frequency bands.

Current monitoring systems usually receive noise and other unwanted signals that obscure signals of particular interest. In a sonar processing system deployed on an ocean-going vessel to detect and track other vessels, the system typically receives signals from natural sources such as wind and waves, from merchant shipping, and from its own vessel. These sonar signals frequently obscure signals of particular interest, such as from a submarine.

The present invention is not limited to processing sonar signals. Digital images can be formed from a variety of input data signals, including seismics, radar, radio, video and film. Because digital images require a very large amount of data storage, it is difficult to process digital images on a real-time basis. Currently no systems provide for high-resolution processing and display of three (or higher) dimensional images on a real time basis.

In other applications, it would be useful to be able to transmit a multi-dimensional image to a remote location. Because a digital image involves a large amount of data, real-time transmission of a multi-dimensional image is impractical in current systems.

It is therefore an object of the present invention to provide a multi-dimensional image processing system that operates in "real-time".

It is a further object of the invention to provide a multidimensional image processing system that allows the suppression of certain objects and the enhancement of other objects in order to "focus-in" on an object or objects of interest.

Yet another object of the invention is to provide a multidimensional image processing system that compresses data for remote transmission, and then reconstitutes the received data to accurately represent the original image.

It is also an object of the invention to store data in a compressed form which can be rapidly and efficiently searched or later retrieved and used to generate data in an uncompressed form.

SUMMARY OF THE INVENTION

In the preferred embodiment, the multi-dimensional processing and display system of the present invention is used with a sonar tracking system. The sonar tracking system provides input sonar data, usually the amplitude of the received signal, at sequential time intervals, to the processing system. The data is arranged in a three-dimensional matrix, the dimensions being bearing, frequency and time. Thus each data element in the matrix represents the amplitude of the signal received at the specified bearing, frequency and time.

The input data (or raw data) is scaled to accentuate or suppress certain bearings, times, and/or frequencies. The three-dimensional matrix is separated into a number of matrices of two-dimensional data which are concatenated together along the bearing dimension to form one large two-dimensional matrix.

The invention creates and maintains a historical database which is also concatenated with the two-dimensional matrix. This database allows loud, interfering sources and noise to be diminished and other sources of interest to be enhanced.

Once the data is in the form of a two-dimensional matrix, the data can be analyzed efficiently using Singular Value Decomposition. The two-dimensional concatenated matrix is decomposed to obtain a compressed form of the matrix, in the preferred embodiment, singular vectors and singular values are obtained. The singular vectors are partitioned into one or more groups on the basis of their corresponding singular values.

Certain data elements in the two-dimensional matrix are enhanced or diminished by modifying the singular values within each of the groups of singular vectors to enhance certain objects that are associated with the data.

An enhanced two-dimensional concatenated matrix is generated by multiplying the two-dimensional concatenated matrix by a diagonal matrix of the modified singular values and a matrix of the singular vectors. The enhanced two-dimensional matrix has enhanced or diminished data values associated with certain data objects.

After data enhancement, the two-dimensional enhanced matrix is partitioned into a series of two dimensional matrices which are then arranged to form an enhanced three-dimensional matrix. All or portions of the enhanced three-dimensional matrix can then be displayed. The preferred embodiment displays data objects as "pipecleaner-like" objects within a three-dimensional transparent cube.

BRIEF OVERVIEW OF THE DRAWINGS

Other objects, features, and advantages of the invention will become apparent from the description of a particular embodiment, taken in combination with the drawings, in which:

FIG. 7A and FIG. 7B is a matrix containing input data with corresponding singular values and singular vectors;

DETAILED DESCRIPTION OF A PREFERRED EMBODIMENT

The multi-dimensional image processing system of the present invention operates in "real-time". It processes input data signals and produces an image having three or more dimensions. It also allows the suppression of certain objects and the enhancement of other objects in the data. The data can be compressed for remote transmission, and then reconstituted when received at the remote location to accurately represent the original data. While the invention is described in its use in one specific application, an ocean-going vessel tracking system, it will be seen that it can easily be used in other applications.

Sonar-processing systems are frequently deployed on ocean going vessels to detect and track other vessels and objects, both surface and sub-surface. Present sonar-processing systems receive data from a set of hydrophones which may, for example, be towed behind the vessel. Data can also be obtained from hydrophones mounted on the bows of ships. The signals from the hydrophones are processed by a beamformer to generate a set of channels which are sensitive to acoustic energy coming from particular directions. The time-series of beam-formed data are passed through digital filters, and can then be displayed.

Figure 1:
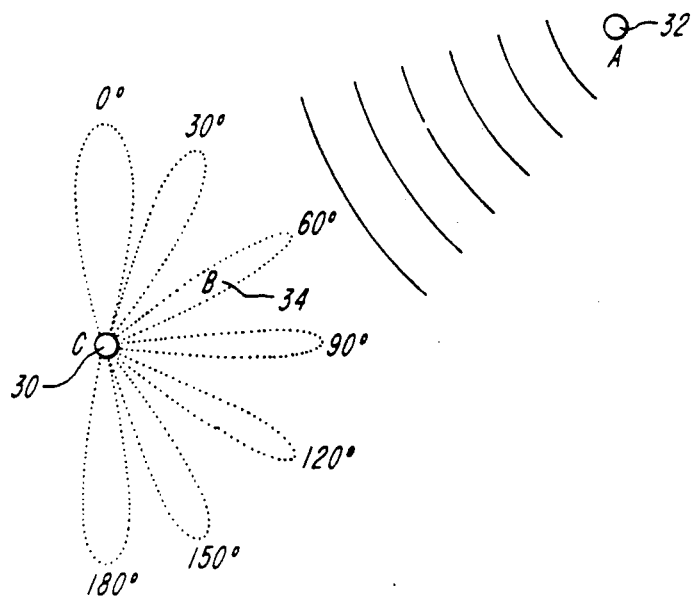
FIG. 1 is a geographic representation of a monitoring system.

FIG. 1 shows a monitoring system 30 which monitors acoustic energy received from seven angles, from 0° ("forward endfire") to 180° ("aft endfire") at 30° intervals. The acoustic energy produced by an object 32, at a location 60° from the monitoring system 30, would be picked up most clearly by the beam 34 pointing in that direction.

For each angle being monitored, the monitoring system determines the amplitude of acoustic energy within a frequency band (or frequency bands) over a discrete time interval. The data is stored and analyzed, being continually updated as new data is received.

Figure 2:
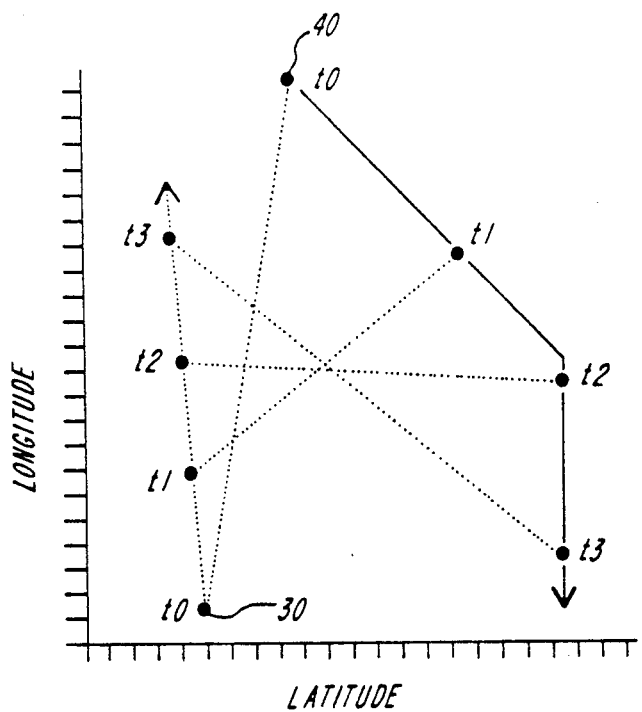
FIG. 2 is an operator monitor showing a passing vessel crossing the path of the monitoring system of FIG. 1.

Referring to FIG. 2, a passing vessel 40 is shown crossing the path of the monitoring system 30 of FIG. 1. The monitoring system will detect the passing vessel at four discrete time intervals, labeled t0, t1 t2, and t3. At t1 the passing vessel is at 45° angle, or bearing, from the monitoring system.

A typical system monitors as many as 50 angles, continuously updating output displays approximately once every ten seconds. The acoustic energy is received from natural sources, such as wind, waves, and marine organisms, or may come from man-made sources, such as merchant shipping, or submarines. This results in a mass of data received at any one time interval. As much as 46,000 bytes of data can be generated by the receiving devices every time interval.

The present system processes input data in real-time, and eliminates unwanted data, such as loud sources or background noise. Using the present invention, an operator can focus in on only a few vessels, which may be very quiet and would otherwise be obscured by other signals.

In current two-dimensional monitoring systems, it is difficult to track vessels across multiple frequencies because only one frequency range can be displayed at one time. Therefore, in prior art systems, the path of a passing vessel can only be viewed if its frequency is within the frequency range being monitored. For example, if passing vessel shown in FIG. 2 had a frequency that was not within the frequency range being monitored by the monitoring system, it would not be visible on the monitoring screen.

When prior art systems display a range of frequencies, they often must summarize the signals at frequencies across the full frequency band. In these systems, it becomes more difficult to distinguish signals on the display as the range of frequencies that is being displayed increases. As the bandwidth, or range of frequencies, increases, the amount of interfering noise and clutter also increases. Therefore, prior-art displays over a large bandwidth are frequently cluttered with undesirable noise.

The present system processes and displays data in a three-dimensional format, allowing data at each frequency to be processed individually and allowing all frequencies to be viewed at one time.

Figure 3:
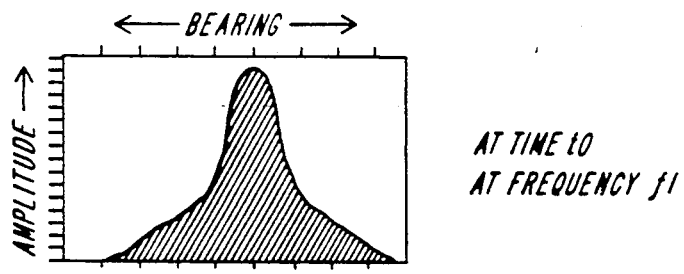
FIG. 3 is a graph of the amplitude vs. bearing of one acoustic source as received at one time interval and within one frequency band.

At each discrete time interval, and for each discrete frequency band or bands, the sonar monitoring system sends to the data processing system the amplitude and the bearing of the received signal. FIG. 3 shows the amplitude vs. bearing representation of one acoustic source as received at time interval $t_0$ and at frequency $f_1$.

Figure 4:
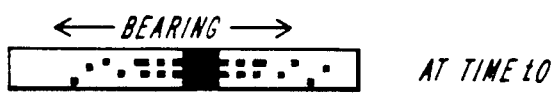
FIG. 4 is the amplitude vs. bearing data of FIG. 3 in a greyscale, or a "bearing time recording" (BTR) format.

Referring to FIG. 4, the present embodiment converts the graphical representation of the amplitude and bearing of the received signal to a greyscale format, or a "bearing time recording" (BTR). A greyscale image is formed from a set of scan lines. Each element within the scan line corresponds to a particular bearing, and the amplitude of the energy received at that bearing is displayed as a shade of grey, from white (0) to black (15), or black (0) to white (15). A collection of such scan lines results in a greyscale image, or BTR.

The greyscale format thus represents, at one frequency band and at one time interval, the amplitude of the received signal over the range of bearings being monitored. The signals for the different bearings are represented as a horizontal vector, and the amplitude is represented by the intensity of the vector at different points. The signals shown in FIG. 3 are equivalent to the greyscale format shown in FIG. 4.

Figure 5:
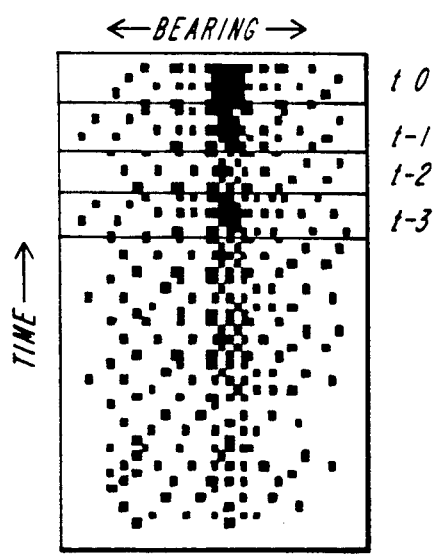
FIG. 5 is a series of BTR scans received at multiple bearings over several time intervals.

FIG. 5 shows a series of scan intervals, shown as multiple greyscale lines, or BTR scans, received at multiple bearings over several time intervals. A BTR scan can be built up as time increases, showing how a signal changes over time. The use of a BTR thus allows the representation of the bearing and amplitude of the acoustic energy received at a particular frequency band to build up over time out of a stack of individual BTR scans.

The BTR representation of bearing, amplitude and time allows the acoustic data to be represented by a matrix. Matrix analysis can then be used to describe patterns found in the BTR. In the present embodiment, the BTR is treated as a graphic representation of a matrix, and Singular Value Decomposition is used decompose the BTR matrix into its temporal and bearing components.

Matrix analysis using singular values and singular vectors is well known in the prior art. The following publications describe such matrix analysis in detail: *Digital Spectral Analysis with Applications*, S. L. Marple, 1987; *Matrix Computations*, G. H. Golub and C. F. Van Loan, 1989; "Singular Value Decomposition and Least Squares Solutions", *Numerical Math*, G. H. Golub and C. Reinsch, 1970; *LINPAC User's Guide*, J. J. Dongarra, et.al., 1979; and "An Improved Algorithm for Computing Singular Value Decomposition", T. F. Chan, *Communications of the ACM*, 1982.

Matrix analysis through the use of eigenvectors and eigenvalues are also well known in the prior art. Three tutorials, all by William H. Hutson, and titled "Outline of Matrix Algebra", "Tutorial on Eigenvalues and Eigenvalues", and "Tutorial on the Basic Structure of a Matrix". These tutorials also apply to singular value decomposition, as singular values are the square root of eigenvalues and singular vectors are equivalent to eigenvectors.

Figure 6:
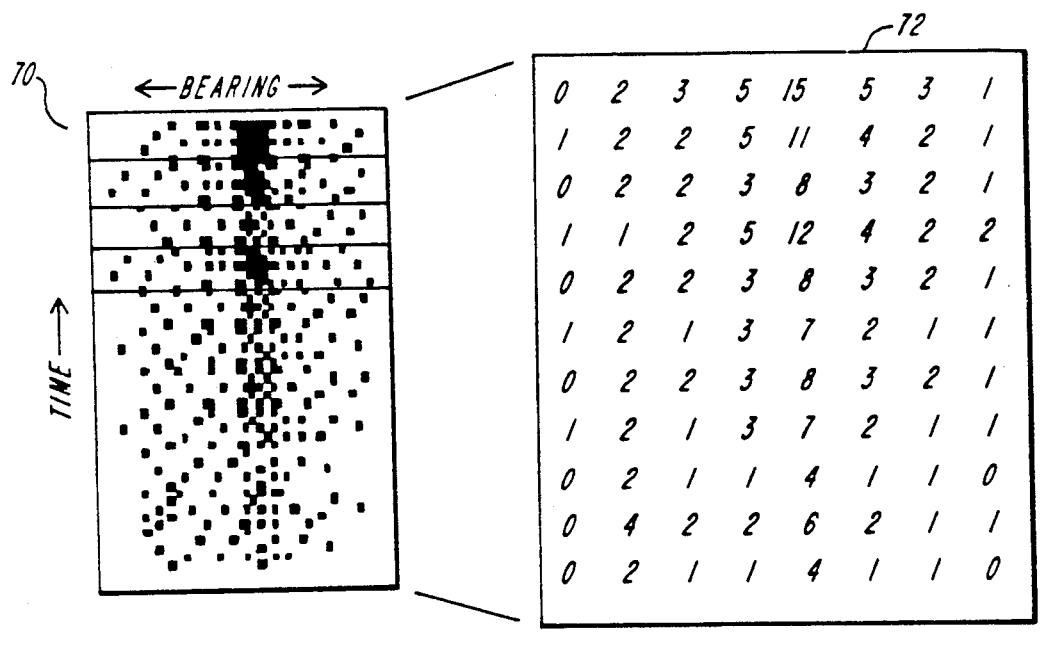
FIG. 6 is a portion of a typical BTR image and a corresponding matrix which is a numerical representation of the BTR image for display.

FIG. 6 shows the output display of a BTR image 70. A matrix 72 provides a numerical representation of the BTR image for display, as illustrated. Integers from 0 to 15 are used to represent the amplitude of the signal, which had been shown in the BTR image by the intensity of the line.

Figure 7A:
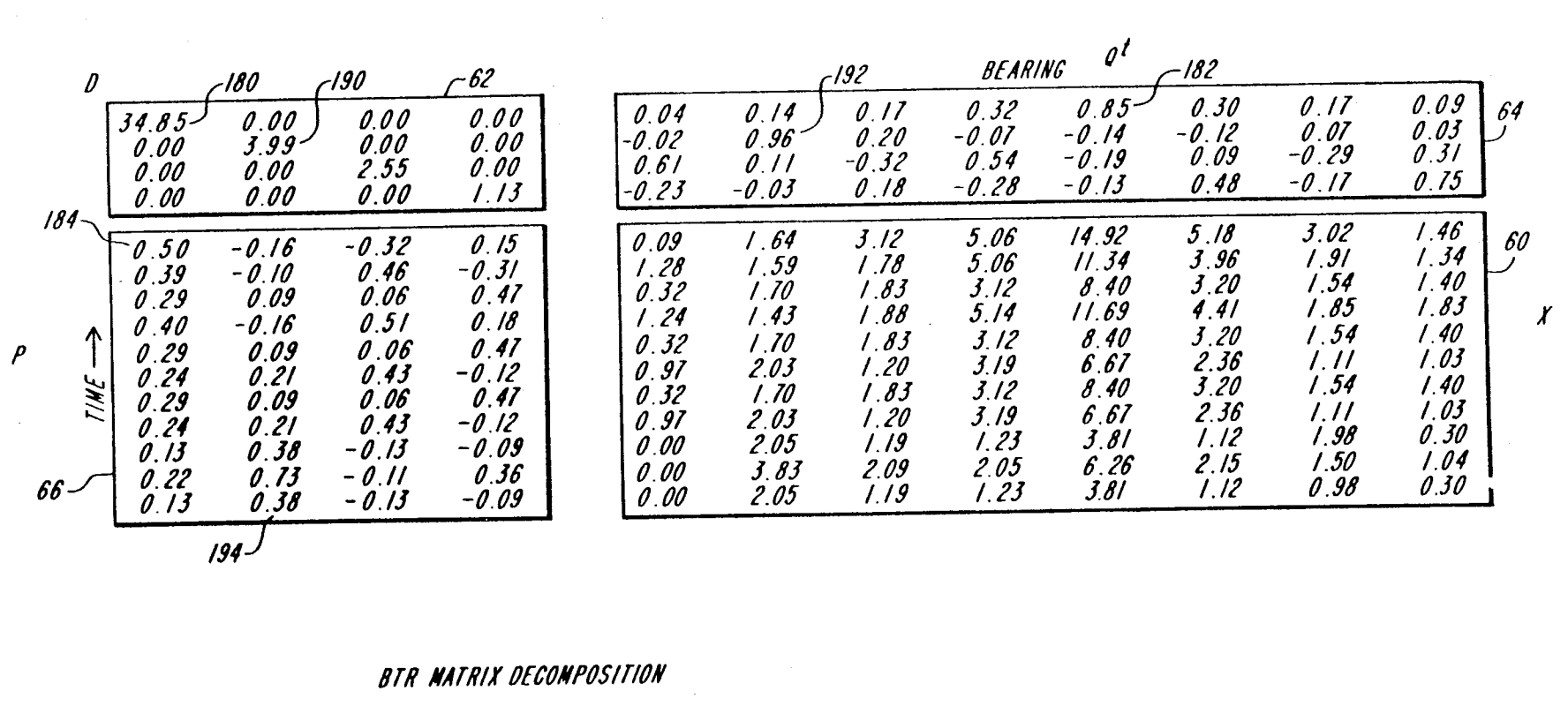
Figure 7B:
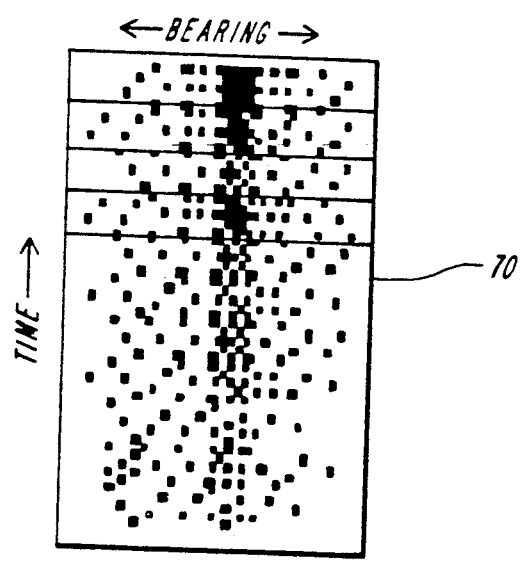
Figure 10:
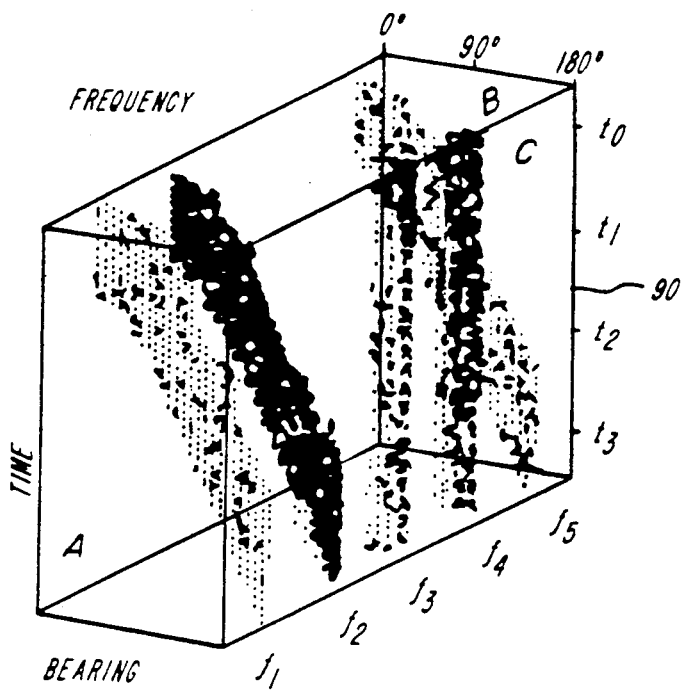
FIGS. 10, 10A, 10B and 10C show an alternate display of the three-dimensional data in which the three-dimensional cube can be "sliced" in any of the three directions.
Figure 10A:
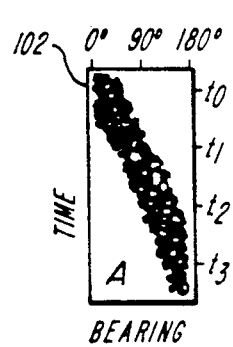
Figure 10B:
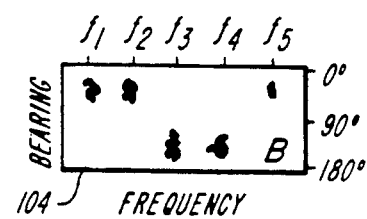
Figure 10C:
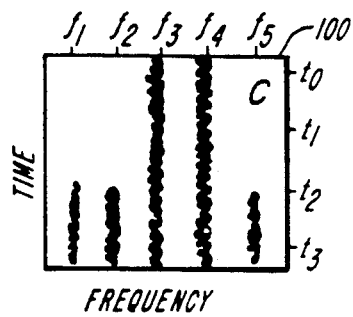

Referring to FIGS. 7A and 7B, the BTR image is represented in a matrix X containing elements arranged in a two-dimensional format (shown in the box marked 60). This matrix can be decomposed, as described in the above references, into right singular vectors, left singular vectors, and singular values. The right singular vectors are arranged in matrix $Q^t$ (shown in the box marked 64). The left singular vectors are arranged in a matrix P (shown in the box marked 66). The singular values (shown in box 62) are arranged along the principal diagonal in a matrix D. Information in the matrix X, which contains input data, can be represented by its right singular vectors $Q^t$ and the singular values D. The raw data can thus be represented in a substantially compressed form.

The matrix X (60) is shown containing, in the present embodiment, the input BTR data. The singular values D (62) and the right singular vectors $Q^t$ (64) are calculated by an algorithm, such as outlined by Golub and Reinsch in *Numerical Math*.

The singular vectors and/or singular values are used by the real-time multi-dimensional processing system of the present invention as a filter to enhance and/or suppress features within the BTR data. The singular values D (62) are displayed in a diagonal form and represent the weights used to adjust the singular vectors. The left singular vectors P (66), in the preferred embodiment, are not explicitly calculated. In the preferred embodiment of the present invention, the input data is post-multiplied by the right singular vectors to enhance the input data. However, in other embodiments, it may be computationally more efficient to enhance the input data by pre-multiplying the input data by the left singular vectors.

The right singular vectors $Q_t$ (64) and singular values D (62) are used to represent important features within the input data, but in a substantially compressed form. In this numeric example, data is compressed by 82%. In larger, real-world applications, the degree of compression would be substantially greater and could reach up to 98% compression. This allows the data to be enhanced, or otherwise processed, and displayed, without losing any necessary data, but saving substantial amounts of computing time.

The data processing system of the present invention substantially reduces the amount of computations that are necessary to process data in real time. Using the present invention, a towed array of hydrophones in which data is updated every twenty seconds would perform 890,000 floating point instructions per second. Without the data "compression" before processing and enhancement, a similar system would require approximately 85,670,000 floating point instructions per second, making real-time image processing difficult, if not impossible.

In the preferred embodiment of the present invention, the data processing system uses singular value decomposition to describe patterns, remove unwanted components, and isolate and analyze components of interest in the BTR image. In alternate embodiments, eigenvector decomposition of the cross-product matrix of the BTR data may be used to decompose the BTR data. As detailed in the previously referenced tutorials, the cross-product of the data matrix X is either X'X or XX'. Eigenvector decomposition is also well known in the prior art.

Figure 8:
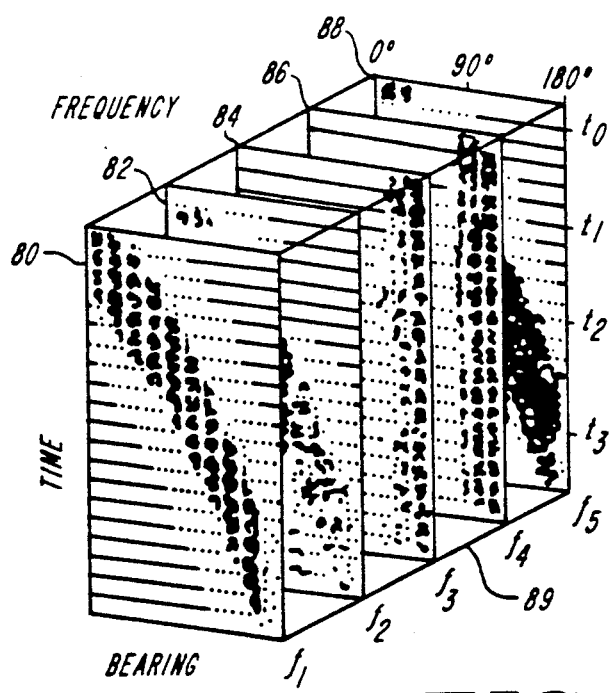
FIG. 8 shows BTR data over several frequency bands arranged in a three-dimensional matrix.

Referring to FIG. 8, the present invention stores multiple BTR images for multiple frequency bands in a three-dimensional matrix. The BTR images 80, 82, 84, 86 and 88 are stacked side-by side, creating a data "cube" 89. The dimensions of the cube are bearing by time by frequency. The amplitude of a signal can be determined by reading the value stored in the cube at any given time, bearing, and frequency.

Figure 9:
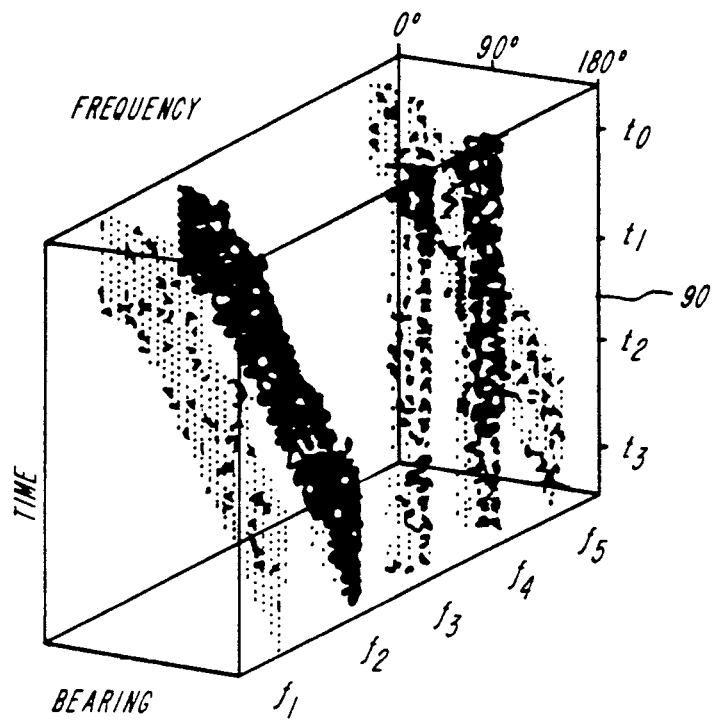
FIG. 9 shows the three-dimensional data displayed using a three-dimensional "transparent cube"

Referring to FIG. 9, one aspect of the present invention is shown, which is to display the data which is stored in a three-dimensional matrix as a three-dimensional "transparent cube" 90. The paths of passing vessels appear as "pipecleaner-like" objects within the transparent cube.

Referring to FIGS. 10, 10A, 10B and 10C, the three-dimensional data cube 90 of FIG. 9 is shown on its three sides. The three-dimensional data cube, arranged as a matrix of data elements, can be "sliced" in any of the three directions, resulting in three faces. Face "A" (102), is a BTR image showing time vs. bearing at a specified frequency. Face "B" (104) is a "FRAZ" face, which shows, for a specified time, the bearing vs. frequency of the signals. Face "C" (100), the "LOFARgram" face shows the time vs. frequency for a specified bearing.

The data can be accessed and visualized from any one of the three different faces of the sonar data cube 90. The "BTR" face is particularly useful because it displays multiple sources of acoustic energy as a function of the locations of the energy sources over time.

Figure 11:
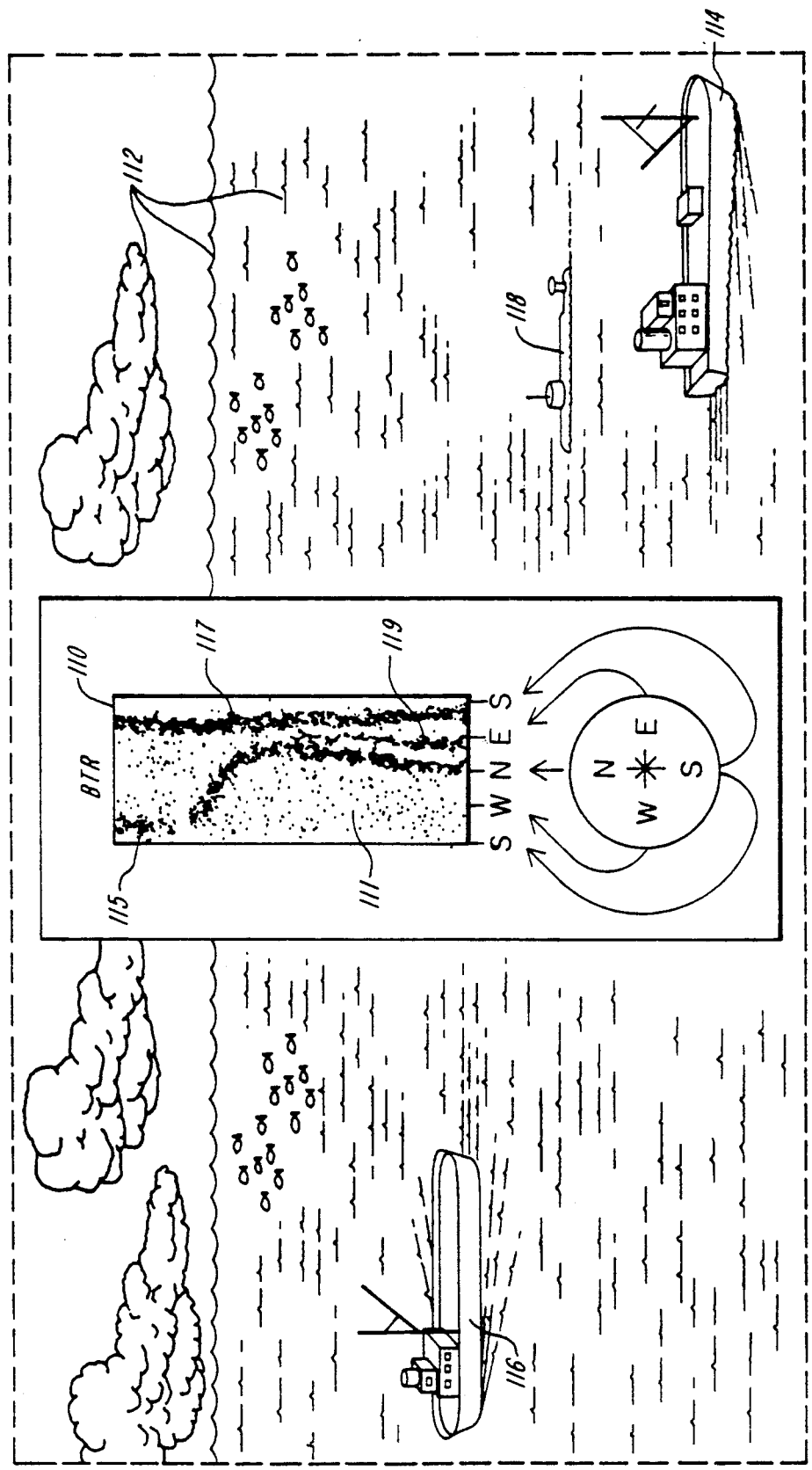
FIG. 11 is BTR data for one frequency band showing various sources of acoustic energy.

FIG. 11 shows a BTR 110 for a particular frequency band. Natural sources of background energy 112, including wind, waves and marine organisms appear as a random, stippled structure 111 throughout the BTR display. Acoustic energy produced by merchant shipping, 114 and 116, appear as vertical traces 115 and 117, corresponding to their general direction and track histories. Other quieter sources, such as submarines 118, may appear as faint traces 119, or may be obscured by loud, interfering sources, such as merchant ships 116 and 114.

Figure 12:
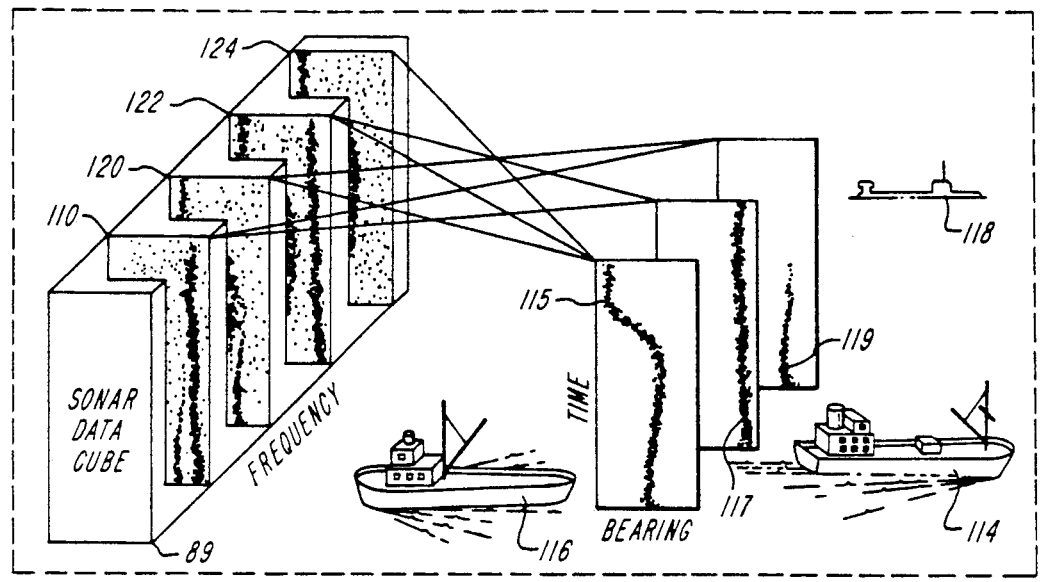
FIG. 12 shows the correlation of features of individual acoustic sources across several frequency BTR's.

Referring to FIG. 12, individual acoustic sources, such as merchant ships 114 and 116, may display acoustic energy at a number of different frequency BTR's. For example a merchant ship 116, produces acoustic energy on frequency BTR's 120, 122 and 124. Another merchant ship 114, produces acoustic energy on frequency BTR's 110 and 122. An unknown submarine source 118, produces acoustic energy on frequency BTR's 110 and 120.

In the preferred embodiment of the present invention, the multi-dimensional data processing system associates similar track histories across multiple frequency bands. For example, referring to FIG. 12, frequency BTR's 110 and 120 are associated with submarine 118, and the BTR's are correlated and displayed as vertical trace 119. Thus, the track history data base may be used to enhance data signals of interest, which are usually weak sources, and removes both unwanted signals, usually loud acoustic sources, and noise.

The system of the present invention implements an algorithm based on singular value decomposition, to aid in detecting and tracking objects. Correlating across time and frequency identifies those frequency bands containing similar track histories. This association enables an operator to detect and isolate acoustic sources, to suppress loud sources and noise, and to enhance other, quieter sources. This selective "partitioning" of sources on the basis of the magnitude of their singular values, or correlation, across frequency bands is important for detection of weak sources in the presence of loud interference and noise.

Figure 13:
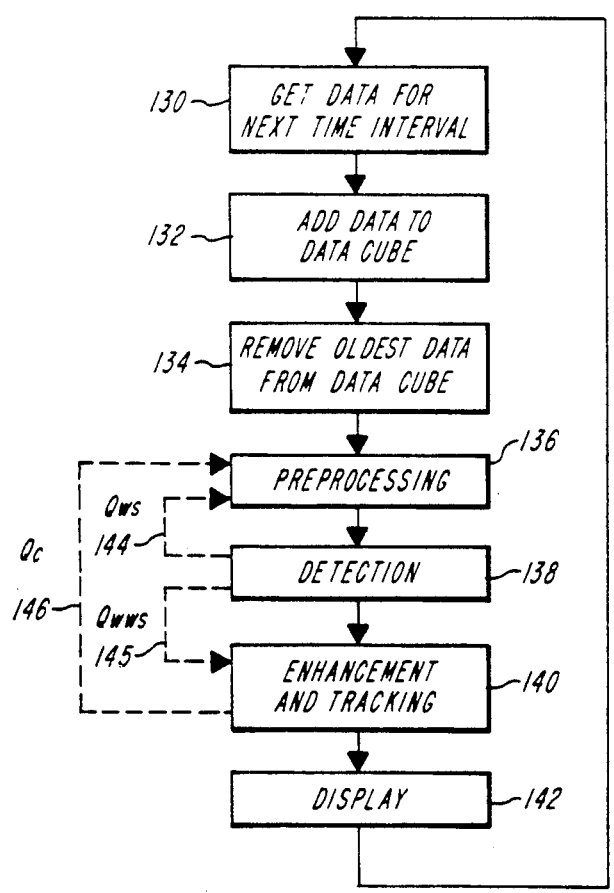
FIG. 13 is a flow chart of the main computer program of the current invention.

Referring to FIG. 13, a flow chart for the main algorithm of the present invention is shown. The algorithm operates on BTR scans, for example BTR slices 110, 120, 122, and 124, for a set of frequency bands over a certain period of time. Initially, input BTR data for one time interval is obtained (130) and added to the three-dimensional matrix (132), and the BTR data for the oldest time interval is removed from the three-dimensional matrix (134). The BTR data, in the form of a three-dimensional matrix Y, is input into a preprocessing function (136). The preprocessing function 136 weights and reformats the data into a two-dimensional matrix X. The data is reformatted by first separating the three-dimensional matrix into a number of two-dimensional matrices, and then concatenating the two-dimensional matrices along a common dimension. In the preferred embodiment, the two-dimensional matrices are concatenated along the bearing dimension. The data, in reformatted into a concatenated two-dimensional matrix, is then sent to the detection function 138 where the BTR data is correlated across frequencies, then analyzed, and partitioned into subspaces in order to emphasize certain signals. The data is sent next to the enhancement and tracking function 140 where it is filtered, enhanced, and arranged back to the form of a three-dimensional enhanced data matrix. Finally, the data is displayed by display function 142. Each of these functions will be explained in greater detail below.

As the BTR input data is passed in a forward direction through these functions, information is also passed backwards to assist in tracking sources of interest. Prior history data is a special set of bearing traces that represents the position and status of acoustic sources within the surrounding area. The bearing traces are in the form of singular vectors which are associated with weak sources $Q_{ws}$ 144, and with bearing track locations of selected contacts $Q_c$ 146. In addition, some of the weak sources $Q_{ws}$ have been weighted, to form weighted weak sources $Q_{wws}$ 145.

Track history data of weak sources $Q_{ws}$ 144 is calculated by the Detection Function 138 and is passed back to the Preprocessing Function 136 to be added to new data. The purpose of this feedback is to build the energy from weak sources to the point where the weak sources may be distinguished from background noise. Weighted weak source $Q_{wws}$ 145 track history data is also passed forward to the enhancement and tracking function 140 to allow signals of interest to be enhanced, and other, unwanted signals, to be diminished.

The prior track history data of selected contacts, $Q_c$ 146 is calculated by the enhancement and tracking function 140 and is fed back to the preprocessing function 136.

The Preprocessing Function

Figure 14:
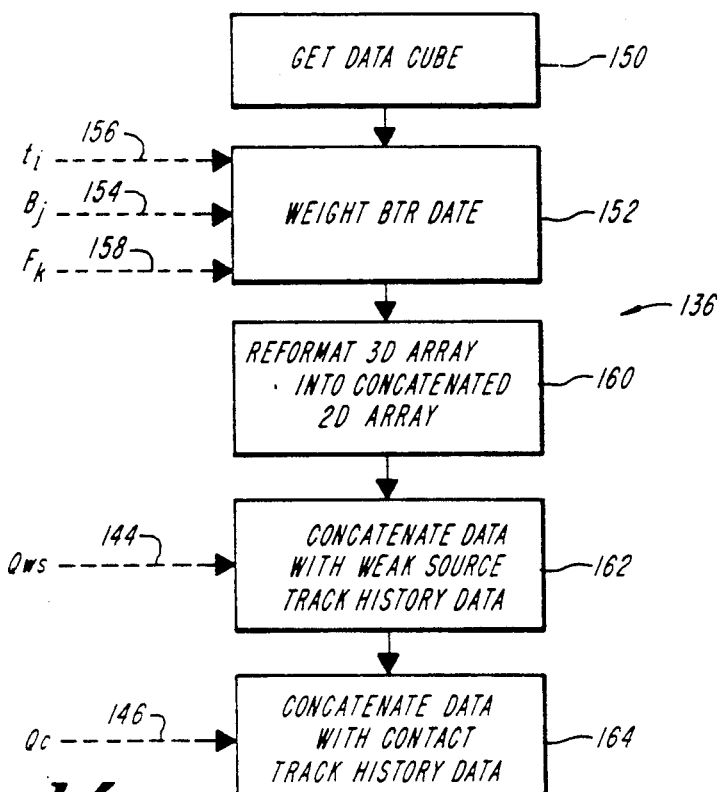
FIG. 14 is flow chart of the preprocessing function.

Referring to FIG. 14, the preprocessing function 136 is shown in greater detail. The preprocessing function 136 weights the three-dimensional input data, separates the three-dimensional matrix into a series of two-dimensional matrices, concatenates the two-dimensional matrices together along the bearing dimension, and then concatenates the two-dimensional matrix with the prior bearing history data. The preprocessing function initially obtains the bearing-time input data (BTR) for multiple frequencies, in the form of a three-dimensional data matrix (150). The preprocessing function, at 152, weights the BTR data to accentuate or suppress certain bearings, times, and/or frequencies.

Each time has a time coefficient $t_i$ 156 which is used to appropriately scale the amplitude data at each time interval. Each bearing also has an associated bearing coefficient $B_j$ 154, which is used to appropriately scale the amplitude data at specified bearings. Similarly, each frequency has an associated frequency coefficient $F_k$ 158, which is used to scale the amplitude value of the data at that frequency. Increasing the magnitude of data at selected bearings, times, and frequencies increases the value of the associated data in subsequent analysis. Decreasing the magnitude of data at other selected bearings, times, and frequencies similarly decreases the value of the associated data in subsequent analysis. The bearing, time and frequency coefficients can either be preset or can be alterable by an operator.

The data is then reformatted at 160 from its three-dimensional format into a concatenated, two-dimensional format. The three-dimensional matrix is reformatted by first separating it into a series of two-dimensional matrices and then concatenating the two-dimensional matrices together along a common dimension. In the preferred embodiment, the common dimension is bearing:

$$B_{f1} : B_{f2} : B_{f3} : \ldots : B_{fn}$$

(Where ":" indicates concatenation along the bearing dimension for frequencies $f_1, f_2, f_3, \ldots, f_n$.)

The data, which had been stored as a three-dimensional data matrix is separated, or sliced into a number of two-dimensional data matrices. These two-dimensional data matrices are then concatentated along the bearing dimension, resulting in one large concatenated two-dimensional matrix. This results in the weighted BTR scans for a given set of frequencies being concatenated together to produce BTR scans that are joined along the bearing dimension, thus creating a new, elongated two-dimensional matrix. The matrix has bearing in one dimension and a combination of time and frequency in the other dimension.

The track histories of weak sources $Q_{ws}$ 144 are continuously updated by the detection function 138 and are passed back from the detection function to the preprocessing function. The track histories of weak sources $Q_{ws}$ 144 are in the form of right singular vectors, which are derived through singular value decomposition in the detection function. The track histories of the weak sources, $Q_{ws}$ 144, are concatenated with the scaled BTR data in the two-dimensional data matrix, shown at 162.

Figure 15:
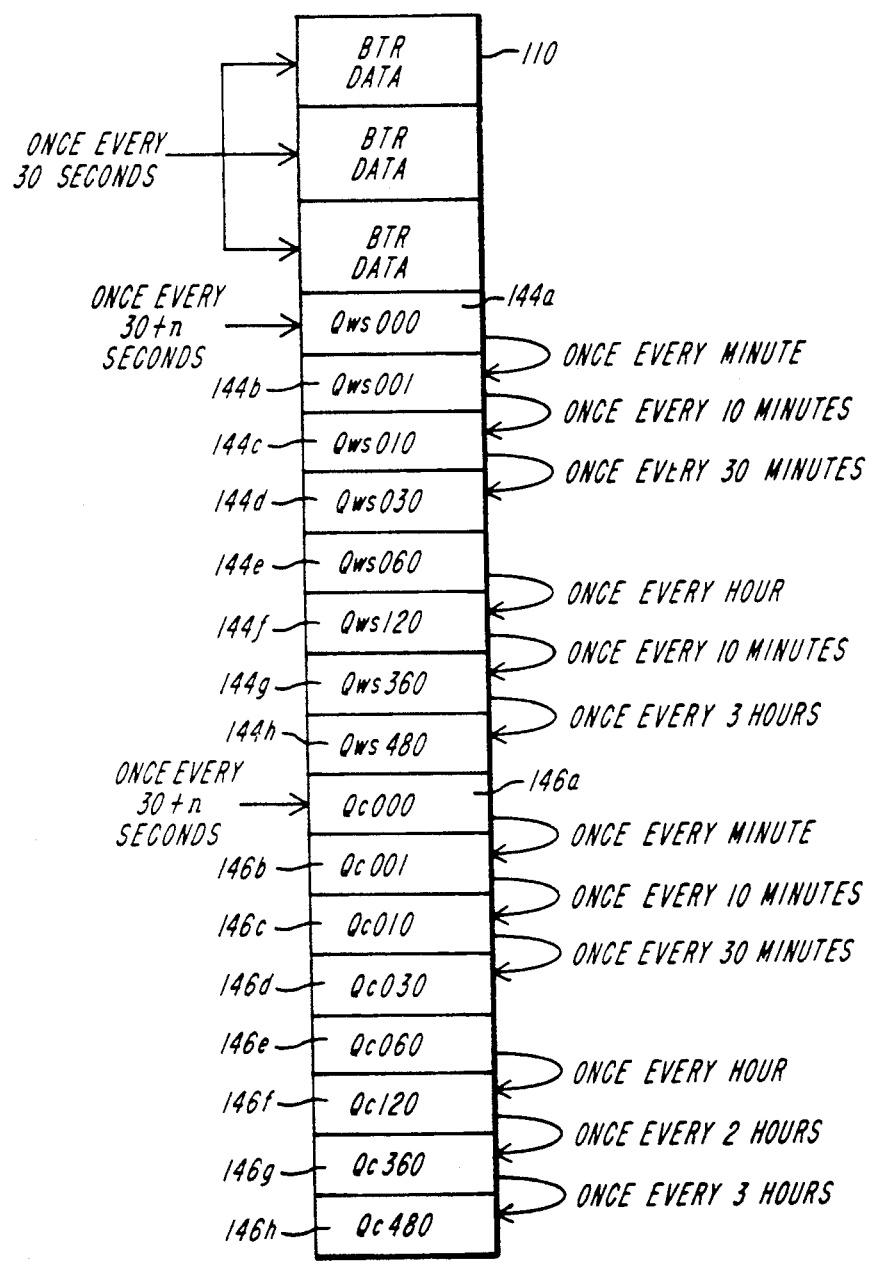
FIG. 15 is the concatenation of the BTR data with the track history database.

Referring to FIG. 15, the track history database is shown. The track history database retains track histories of weak sources $Q_{ws}$ (144a to 144h) and track histories of selected contacts $Q_c$ (146a to 146h). For example, in FIG. 15 the BTR data is combined with track history data every 30 seconds. The entire data set, containing current BTR data and historical data, is then analyzed using singular value decomposition. In the preferred embodiment, this process is repeated every 30 seconds, and the historical data base is continually updated.

The track history data base is created and continually updated using the track history received from the detection function and the enhancement and tracking function. The track history database contains historical data that shows the status of the surroundings as determined for several previous time intervals. In the preferred embodiment, data is stored for the previous 30 seconds; one minute, 10 minutes, 30 minutes, one hour, two hours, three hours and four hours.

The track history database is updated by storing the most recently received track history data of weak sources $Q_{ws000}$ 144a and of selected contacts $Q_{c000}$ 146a every 30+n seconds, where n refers to the additional time the system takes to perform the singular value decomposition calculations. Every one minute, the track history $Q_{ws000}$ 144a is "passed back", or stored in the database, to represent the historical status one minute previously. This data becomes $Q_{ws001}$ (shown as 144b). Similarly, in the preferred embodiment, historical data is "passed back" every 10 minutes, 30 minutes, one hour, two hours, and three hours.

The track history of selected contacts $Q_c$ is entered into a historical database in a manner similar to the track history of quiet sources $Q_{ws}$.

The present invention thus provides for a historical database representing the data at these time intervals to be created and continuously updated. Historic track data is efficiently maintained in compressed form. Each new analysis includes the compressed, historic data, which is equivalent to a full analysis of the full (uncompressed) historic data, yet at a fraction of the computational cost.

Referring again to FIG. 14, the contact track history data $Q_c$ 146 is continuously updated by the enhancement/tracking function 140, and is passed back to be used by the preprocessing function. This data is also weighted and concatenated with the two-dimensional weighted BTR data, shown at 164.

$$B_{f1} : B_{f2} : \ldots : B_{fn} : Q_{ws} : Q_c$$

Detection Function

Figure 16:
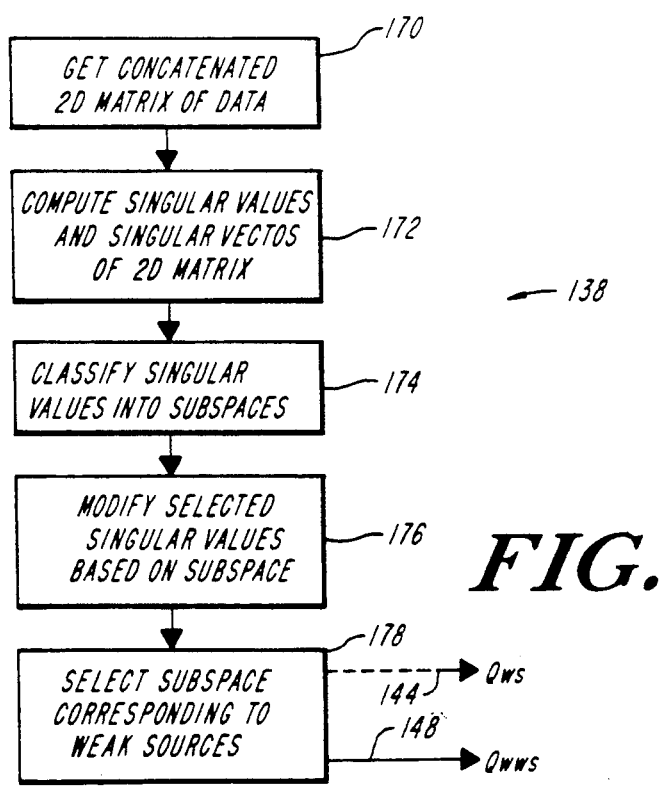
FIG. 16 is flow chart of the detection function.

Referring to FIG. 16, the Detection Function 138 is shown in greater detail. The Detection Function correlates the BTR track history data across frequency and time, analyzes the data in terms of its dominant singular values and associated right singular vectors, and partitions the data into subspaces on the basis of their singular value structure.

The weighted BTR data in the form of a two-dimensional matrix is obtained from the preprocessing function at 170. The BTR data is analyzed at 172 by Singular Value Decomposition (SVD), or in an alternative embodiment, through Eigenvector Decomposition (EVD) of the bearing-by-bearing correlation matrix X'X. Singular value decomposition results in an associated matrix of singular values and singular vectors which has been derived from the BTR data.

SVD (X)→D, Q' (Using Singular Value Decomposition)

EVD (X'X)→D, Q' (Using Eigenvector Decomposition)

Referring again to FIG. 7, the matrix X (60) is defined in terms of its singular values D (62), its right singular vectors Q' (64), and its left singular vectors P (66). The singular value shown in the first row and the first column of the singular value matrix D (180), and having a value of 34.85, indicates the magnitude of the corresponding right singular vector shown in the first row of the right singular vector matrix $Q^t$. The right singular vector in the first row and centered at the fifth bearing location has its largest value of 0.85 (shown at 182) centered at the fifth bearing location indicating the location of a contact. The associated left singular vector $P_1$, shown in the first column of the matrix P is shown increasing in magnitude (i.e. getting louder) with time, indicating that the contact is approaching. Similarly, singular value $D_2$ (190), having a value of 3.99, indicates the magnitude of another, weaker source. The right singular vector $O_2{}^t$, the second row in matrix $Q^t$, has its largest value, 0.96, located at the second bearing location indicating the location of this contact. The left singular vector $P_2$, the second column of matrix P, shows the signal growing weaker with time, indicating that this contact is moving away from the array.

Referring again to FIG. 16, after decomposing the concatenated two-dimensional matrix to obtain its singular values and right singular vectors, the Detection Function next, at 174, classifies the singular values into subspaces. The track history data corresponding to weak sources $Q_{ws}$ is computed by subspace selection. The singular values that have been derived from the BTR data are classified into subspaces based on the magnitudes of the singular values. In the preferred embodiment, singular values are classified as one of three subspace categories: loud sources, weak sources, and noise.

Figures 17A, 17B:
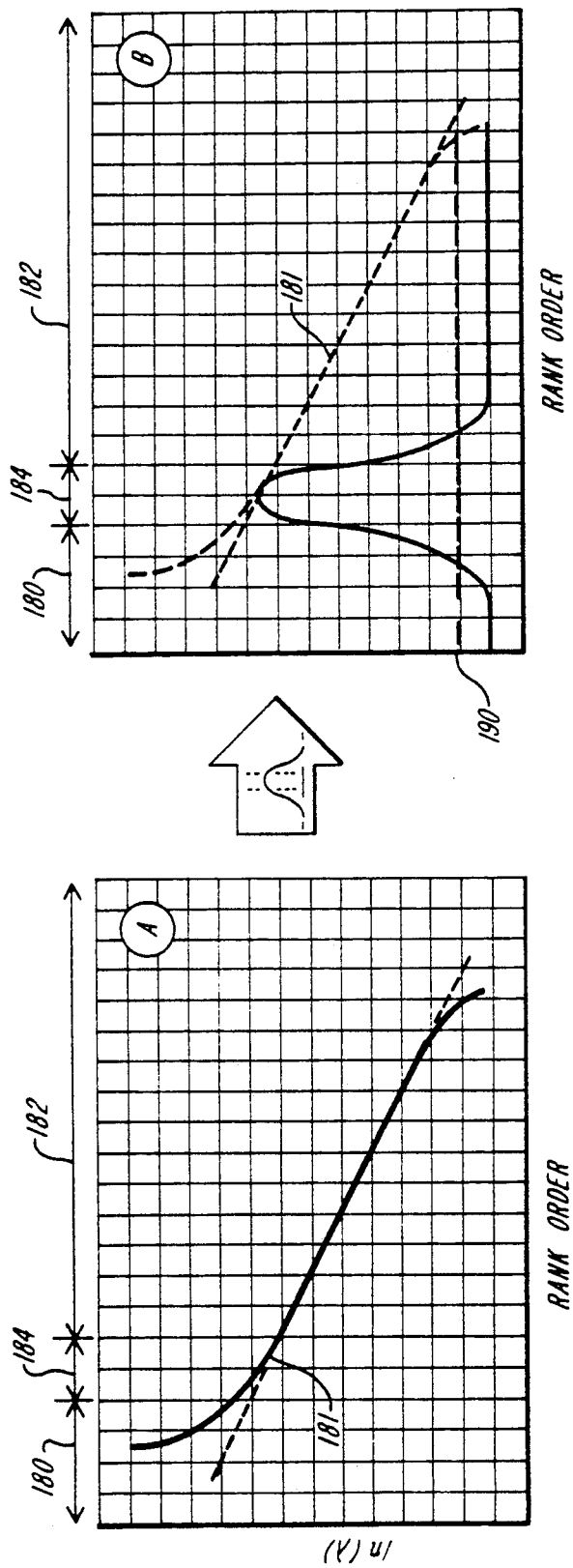
FIG. 17A is a graph of the logarithm of the singular values vs. their rank order.
FIG. 17B is a graph of the logarithm of the singular values of FIG. 17A passed through a function.

FIG. 17A shows a typical plot of the logarithm of the singular values ordered according their magnitudes. The graph shows a log-linear relationship 181. The linear portion of the graph is characteristic of the singular value structure of noise.

The left hand side of the graph shows larger values, corresponding to loud sources, and the right hand side corresponds to smaller values, typically corresponding to noise. In the present invention, the singular values are classified into one of three categories, loud sources 180, weak sources 184 and noise 182.

In the preferred embodiment, the entire range of singular values need not be calculated. Instead, to economize on computer calculations, the singular values and corresponding singular vectors may be derived sequentially. Once the logarithm of the successive singular values appears to decrease in a linear manner (as shown at 181 in FIG. 17A and 17B), the singular values do not need to be calculated any longer. In alternate embodiments, calculation of the singular values can be stopped when the singular values reach a certain value, when the derivative of the singular values reach a constant level, when a certain number of singular values have been calculated, or using some other criteria. For example, in one embodiment only seven singular values are calculated for every matrix.

The detection function then, at 176, modifies selected singular values based on the subspace selection performed at 174. The BTR data is filtered and enhanced using the modified singular values and right singular vectors.

Referring to FIG. 17B, the detection function modifies the weights of the singular values to reduce the importance of the singular vectors associated with loud sources 180 and noise 182 and also to enhance weak signals 184. Enhanced singular vectors whose singular values are below a certain threshold 190 may then be eliminated. In this manner, a subset of singular vectors $Q_{ws}$ is selected based on the weighted singular values of weak sources 184.

Figures 18A, 18B:
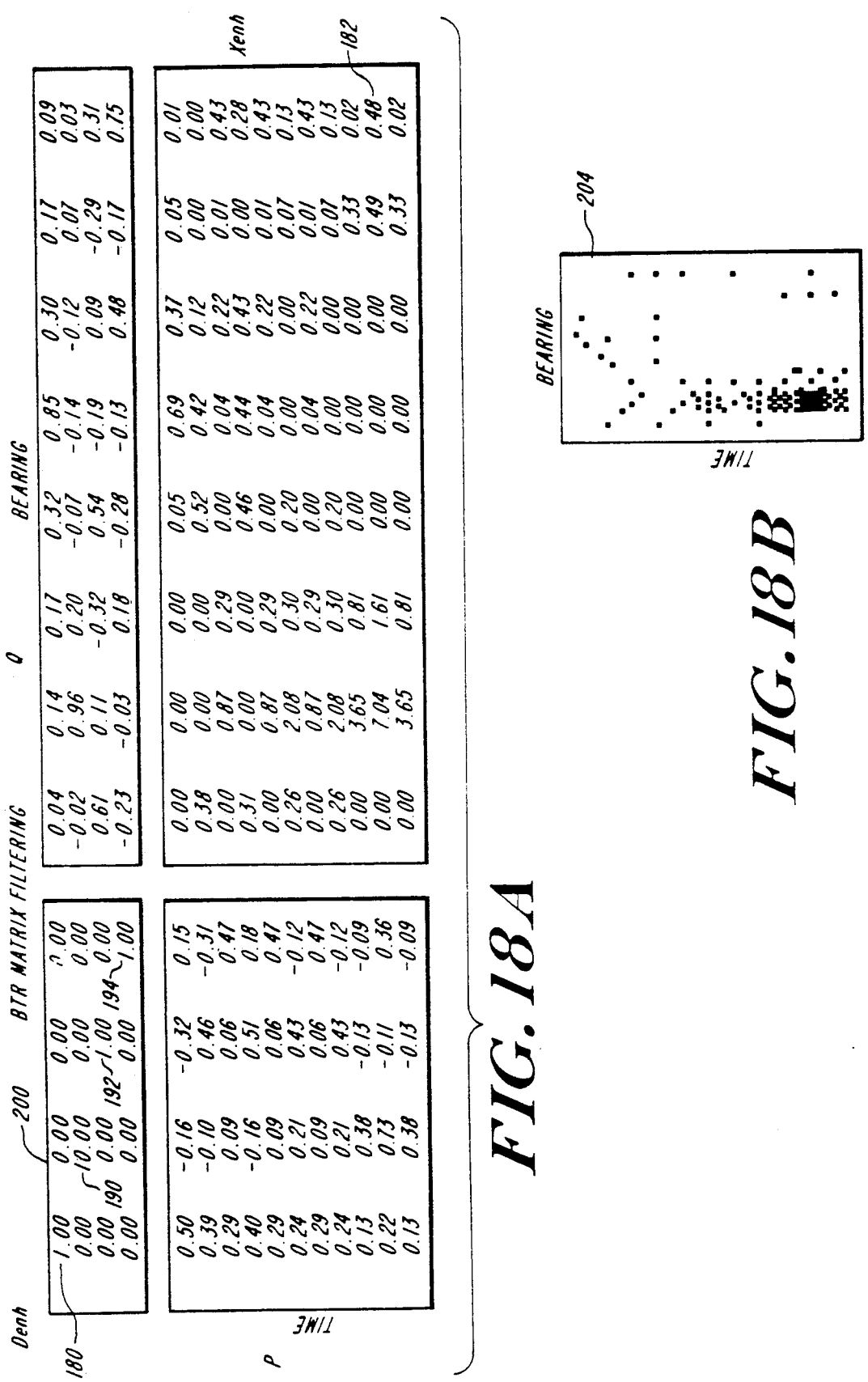
FIGS. 18A and 18B show a matrix containing enhanced BTR data with the corresponding singular vectors and modified singular values.

The method of enhancing the data is shown in FIGS. 18A and 18B. In FIGS. 18A and 18B the BTR data that was used in the example in FIGS. 7A and 7B is shown. However, the singular values $D_{enh}$ (200) of the data have been modified to enhance certain weak signals and to diminish stronger signals. The singular value associated with a loud acoustic source, $D_1$ (180) has been reduced from 34.85 to 1.00. The singular value associated with a weak acoustic source, $D_2$ (190) has been increased from 3.99 to 10.00. Noise signals have similarly been diminished, in this example, $D_3$ (192) was reduced from 2.55 to 1.00, and $D_4$ (194) was reduced from 1.13 to 1.00. The values for the singular vectors remain the same. The resulting BTR data $Y_{enh}$ is shown at 182, and the graphic display of this data is shown at 204. In this display, the weak source is now prominently displayed, while the strong source has been diminished. Referring to FIG. 16, the detection function at 178 computes a set of track history data corresponding to weak sources Qws, which describe the bearing histories of acoustic sources across many frequencies of the signal subspace. Qws may be rotated to maximize its loadings towards a particular bearing.

The right singular vectors associated with weak sources, $Q_{ws}$, may be weighted by adjusting the singular values, resulting in weighted weak sources $Q_{wws}$ (145). The detection function 138 passes track history data in the form of right singular vectors $Q_{ws}$ 144 back to the Preprocessing Function 136. The detection function 138 then passes the weighted right singular vectors $Q_{wws}$ 145 forward to the enhancement and tracking function 140.

Enhancement and Tracking Function

Figure 19:
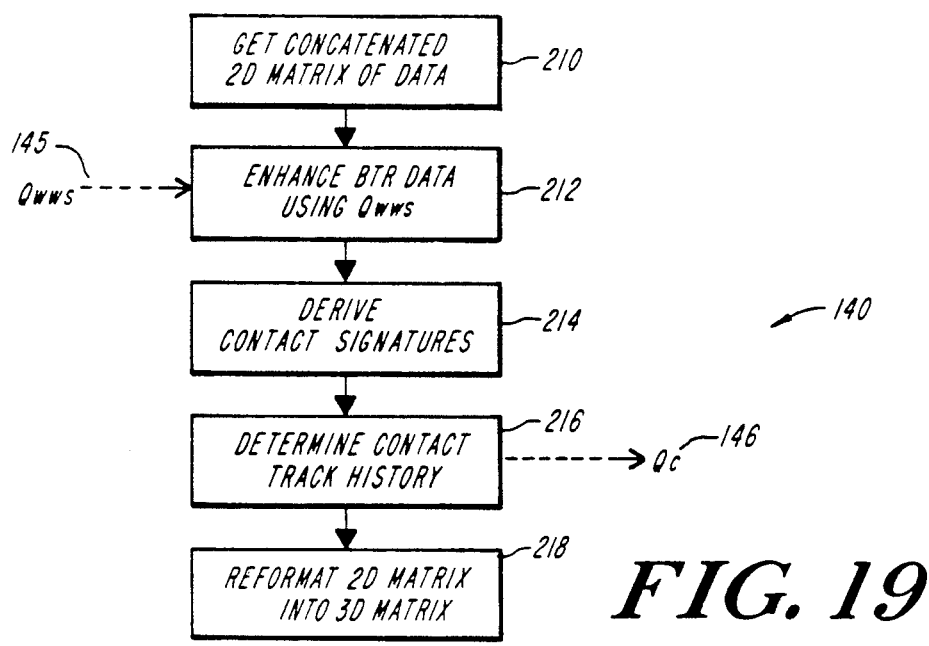
FIG. 19 is flow chart of the enhancement and tracking function.

Referring to FIG. 19, the enhancement and tracking function 140 is shown in greater detail. The concatenated two-dimensional matrix of BTR data Y and the weighted weak source right singular vectors $Q_{wws}$ (184) are passed in from the detection function.

The enhancement function uses the weighted weak source right singular vectors $Q_{wws}$, which correspond to track histories of acoustic sources, to enhance the BTR data. The enhanced BTR data 60 is generated at 212 by projecting the BTR data onto the weighted singular vectors. The adjusted right singular vectors $Q_{wws}{}^T$ may be pre-multiplied by their transpose $Q_{wws}$ and used as a spatial filter, $(Q_{wws} Q_{wws}{}^T)$, to enhance and/or suppress information across all BTR data.

$$Y_{enh} = Y(Q_{wws}) Q_{wws}{}^T$$

or alternately, $$Y_{enh} = (Y Q_{wws}) Q_{wws}{}^T$$

Contact frequency signatures $S_c$ are derived at 214 from the enhanced BTR data and are correlated with the original incoming data to determine and produce, at 216, contact track history $Q_c$ 146. The contact track history data $Q_c$ is $$Q_c = S_c{}^T (B_{f1} : B_{f2} : \ldots : B_{fn})$$

where the frequency signatures $S_c$ are correlated and stored as a vector of amplitudes:

$$S_c = [S_{f1}, S_{f2}, \ldots, S_{fn}];$$

and

The BTR data is concatenated at each time interval, $t_i$, into FRAZ format:

$$F_i = [B_{f1} : B_{f2} \ldots : B_{fn}];$$

and

The dot product $Q_c = S_c^T F_i$ is calculated.

The track histories of weak sources for certain frequency bands can be selected for BTR display. The enhanced track histories of weak sources may be re-scaled and/or normalized for display purposes. To display across a band of frequencies, the signal subspace associated with $Q_{ws}$ is computed either by summing the squared left singular vectors (i.e. $Y \; Q_{ws}$), or by squaring and summing the enhanced data.

A contact of interest may be identified by its contact frequency signature by examining the enhanced data along a particular bearing and time, or by examining the data through a set of scans, linked along track in the summary energy BTR, or through examination of the transparent data cube. The frequency signature, $S_c$, is derived through analysis of the linked data or through analysis of the transparent data cube.

Frequency signatures may be chosen, for example, by finding the beam/time which is most characteristic of features associated with acoustic sources and read off and placed in a frequency vector.

Figure 20:
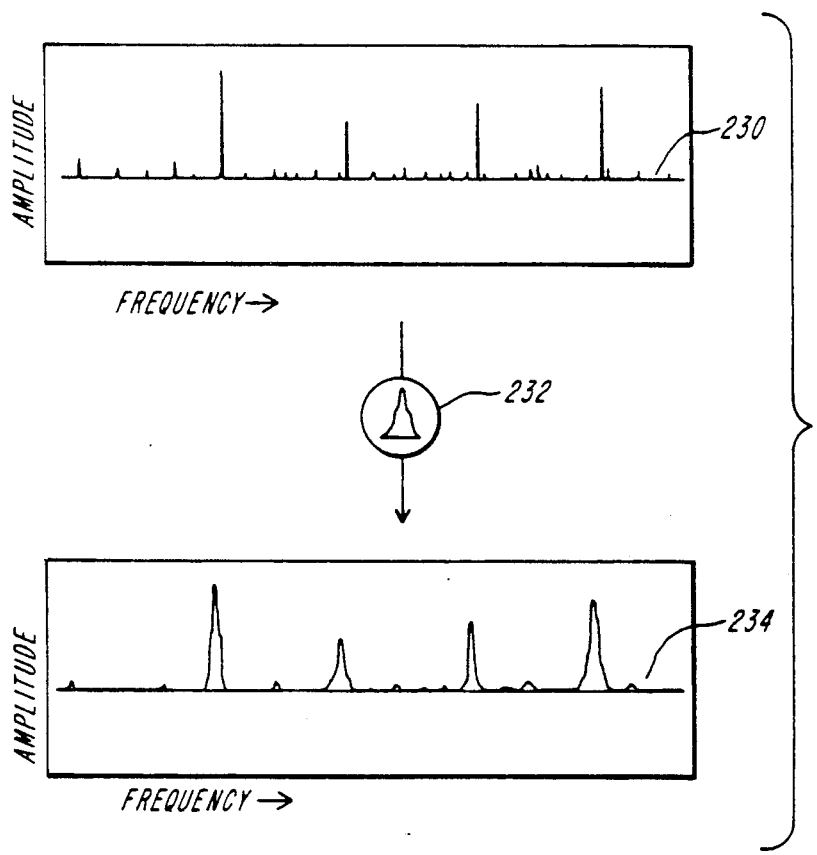
FIG. 20 is a frequency signature convolution.

Referring to FIG. 20, an acoustic contact is identified by a unique frequency signature 230. The frequency signature is read from the enhanced sonar data cube at a particular time and bearing, or averaged along a curved time/bearing "slice". Alternately, the frequency signature can be computed through Singular Value Decomposition of linked data in a time/bearing slice, or alternatively through Eigenvector Decomposition of its associated cross-product matrix. The frequency signature is used to track an acoustic source across time and bearing, by correlation with incoming data. Frequency signatures may change erratically and unpredictably when changes occur in the acoustic source itself or when the acoustic energy is modified while traveling through the constantly changing ocean environment. In the preferred embodiment of the present invention, a convolution function 232 may be used to broaden the features of the frequency signature. The resulting signature $S_c$ (234) may also be thresholded. The resulting signature $S_c$ (234) is less sensitive to slight frequency variations, which could be caused by doppler shifts, frequency instabilities, or other uncertainties.

Contact track histories of selected contacts $Q_c$ are determined by projecting BTR data onto the contact frequency signatures via correlation:

$$Q_c = S_c^T F_i$$

In addition, contact track history $Q_c$ and weak source track history $Q_{ws}$ can be displayed. A summary contact track history can be computed by summing the associated squared vector $Q_c$ along the frequency dimension, or by squaring and summing the enhanced data, which can then be re-scaled and normalized for display purposes. The contact track history data can be projected into the three dimensional space by pre-multiplying by frequency signature $S_c$, thresholding the data, and displaying the data as a transparent data cube:

$$Y_c = thr \, |(Y Q_c) Q_c^T| \text{ or } thr \; Y (Q_c Q_c^T),$$

The enhanced data $Y_{enh}$ may similarly be thresholded and displayed as a transparent data cube:

$$Y_{enh,thr} = thr \, |(Y Q_{ws}) Q_{ws}^T|$$

or $thr \; |Y (Q_{ws} Q_{ws}^T)|$

After loud sources and noise have been suppressed, and weak sources have been enhanced, the "Enhanced BTR" data is again reformatted. However this time, the reverse procedure is followed. The concatenated two-dimensional matrix is first partitioned along the common dimension into a series of two-dimensional matrices. The series of two-dimensional matrices are then arranged into a three-dimensional format. The enhanced BTR data is then passed as a sonar data cube for display while the contact track history $Q_c$ is sent back to the preprocessing function to be used in analyzing incoming data.

Display

Figure 21A:
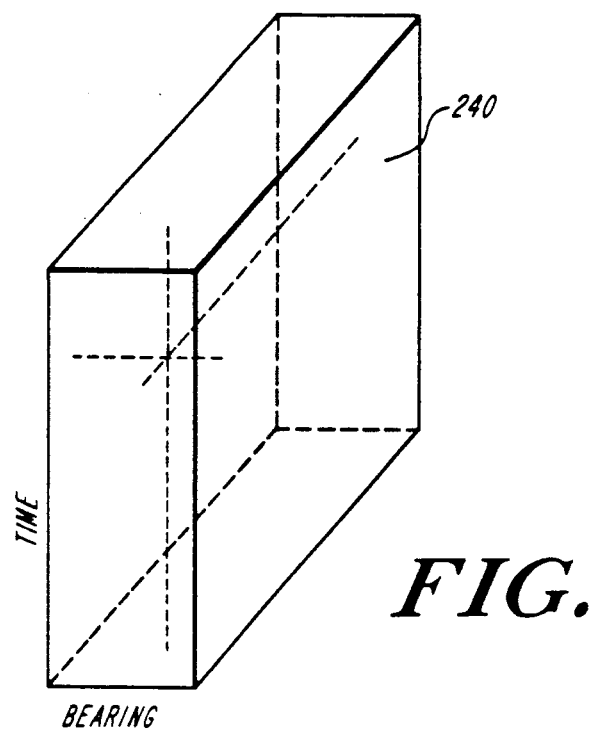
FIGS. 21A and 21B are an operator display.
Figure 21B:
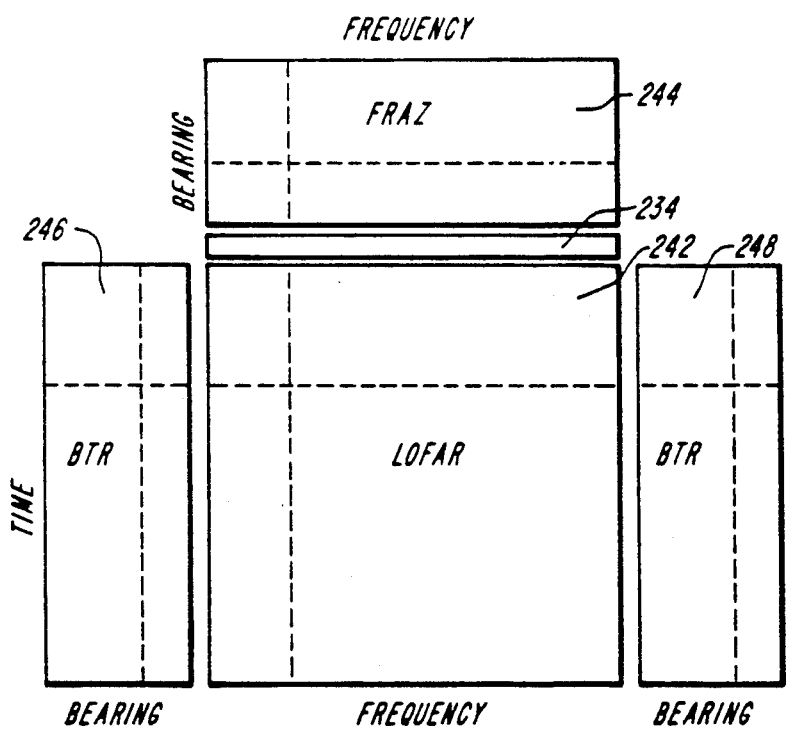

Referring to FIGS. 21A and 21B, in the preferred embodiment of the present invention, enhanced sonar data is displayed in the form of a transparent data cube 240 on an operator interface screen. The operator can interactively rotate the three-dimensional transparent cube through various angles. Contacts appear as "pipe-cleaner-like" objects within the transparent cube 90.

The three-dimensional cube can be rotated and displayed from different perspectives. The transparent cube contains enhanced and thresholded three-dimensional data, and therefore the transparent cube displays an object in a true space-time format. This type of display is not possible in prior art systems which do not eliminate noise, nor correlate enhanced data across three dimensions.

The screen display includes time, bearing, and frequency cursors, which allow an operator to freely "travel" through the cube, displaying the data at any time, frequency and bearing. The operator can use these cursors to control the display of "slices", or planes, through the cube. Frequency by time 242 is shown in LOFAR format for a particular bearing. Frequency by bearing 244 is shown in FRAZ format for a particular time. Bearing by time 246, 248 is shown in BTR format for a particular frequency band or bands. BTR display 246 could be used to display selected contacts of interest $Q_c$ while BTR display 248 could be used to display weak sources $Q_{ws}$. The various displays are arranged so that they share a common dimension. For example, the FRAZ display and the LOFAR display each share the frequency dimension, and the LOFAR and BTR displays share the time dimension.

While the display of "slices" of data can contain either the original sonar data or can be switched to the enhanced data, the transparent data cube can only display enhanced, thresholded data.

Cursors in the displays are linked so that as the operator moves one cursor, cursors in the other displays will move accordingly. The cursor movement controls the positioning and slicing of the sonar data cube and the displays. For example, moving the time cursor in the LOFAR display would cause the FRAZ display to change rapidly. Similarly, moving the bearing cursor in the BTR display or in the FRAZ display would cause the LOFAR display to change accordingly. The frequency signature 234 at the specified time and bearing is displayed in a separate window on the screen.

Data can be scanned rapidly within the BTR, FRAZ, and LOFAR windows, giving a "cartoon" presentation on the operator screen. In addition, a summary of contact track history, including summary energy BTR and contact summary BTR, can be displayed in multiple windows. Subbands, subintervals and bearing sectors can also be displayed.

Subsets of the data can be displayed in a variety of ways. Subcubes in multiple windows can be used to display sector BTR's (i.e. selected bearings), sector summary BTR's, summary energy BTR (i.e. all contacts), and summary contact BTR (i.e. all contacts being tracked by $Q_c$). Subbands, such as portions of LOFAR bands or FRAZ subbands, can also be displayed in multiple windows. Any part of the cube can be displayed as a subcube.

Figure 22:
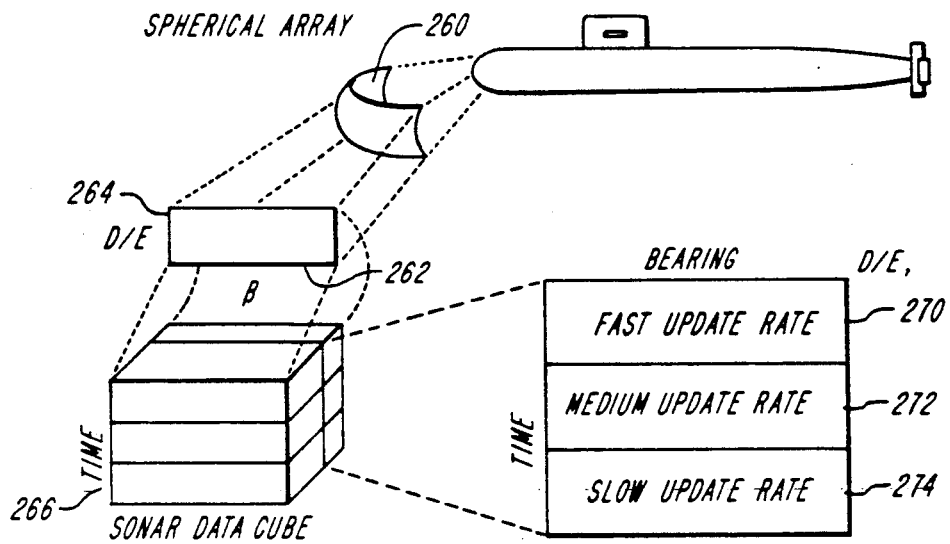
FIG. 22 is an alternate embodiment of the present invention in which sonar data is obtained using a spherical array.

Referring to FIG. 22, an alternate embodiment of the invention is shown. Acoustic data is obtained from a two-dimensional spherical sonar array of hydrophones 260. The dimensions of the data that is obtained are bearing 262 and depression elevation angle (D/E) 264, with a third dimension being time 266. A typical spherical sonar system might have 400 data channels, covering 40 different bearings and 10 different D/E angles. Typically, a measure of the total (filtered) energy would be updated many times a second. In addition, multiple frequency bands could be monitored, in which case the data processing system of the present invention would process data in a four-dimensional format.

The data obtained from the spherical array of hydrophones is processed similarly to data obtained by a towed array of hydrophones. After processing, the data is typically displayed by a bearing-by-time display, which would be presented to an operator for a selected D/E angle in a three-part display: the top portion 270 is updated at a fast rate (e.g. 6 times a second), a middle portion 272 is averaged and updated at a slower rate (e.g. once every 10 seconds), and a bottom portion 274 is averaged and updated at an even slower rate (e.g. once every 40 seconds). For this embodiment, each D/E by bearing "slice" would be input to the processing function that was previously described.

Figure 23:
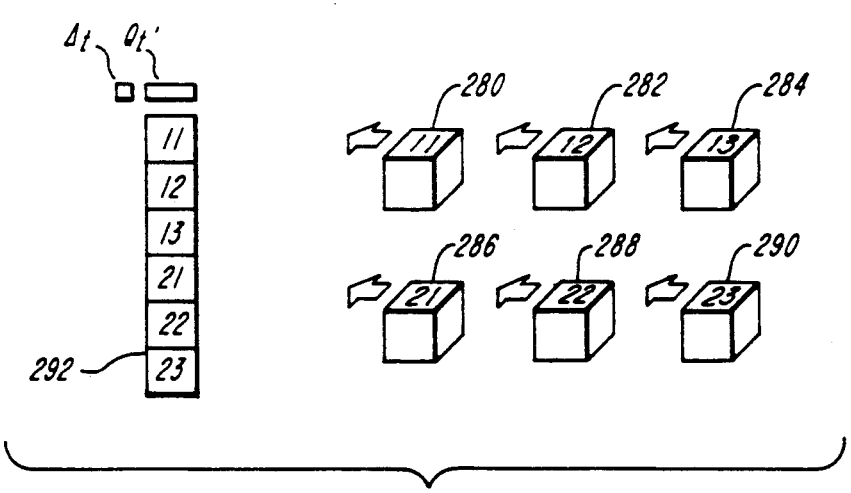
FIG. 23 is an alternate embodiment of the present invention where five dimensional data is processed.
Figure 24:
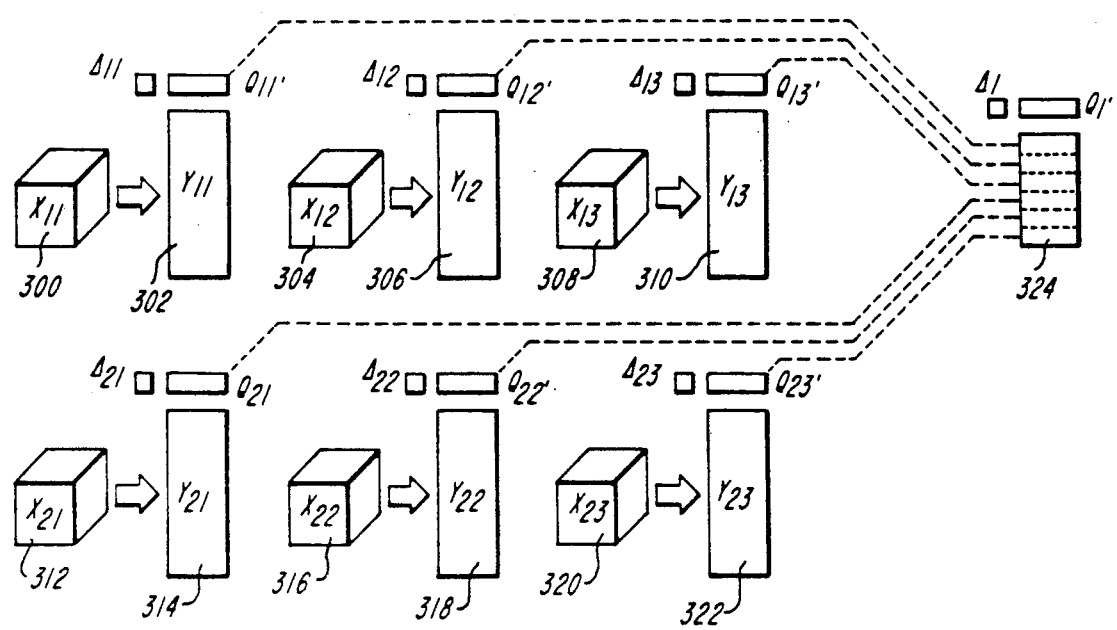
FIG. 24 is an alternate method of processing five dimensional data.

Referring to FIG. 23 and 24, the present invention can be applied to five dimensional data processing systems. FIG. 23 shows data obtained from a fixed sonar system consisting of multiple sensor arrays distributed over a large geographic area. Each of the sensor arrays provides three-dimensional data. The three-dimensional data cubes are arranged as a two-dimensional matrix of three-dimensional matrices. In this embodiment, at each time interval, a new surface 280, 282, 284, 286, 288, and 290, is added to the top of each data cube. The new data is concatenated into one, two-dimensional matrix 292, and the matrix is processed as described earlier.

Referring to FIG. 24, an alternate method of processing the multiple sensor matrices distributed over a large geographic area is shown. In this embodiment, each of the sonar data cubes 300, 304, 308, 312, 316 and 320, is processed separately into a two-dimensional matrix 302, 306, 310, 314, 318 and 322. The singular values and right singular vectors for each of the resulting two-dimensional matrices is then calculated. The singular vectors are combined into one two-dimensional matrix 324 and processed according to the invention as described earlier. In this manner, higher dimensional data may be recursively reduced and processed according to the invention described earlier.

Figure 25:
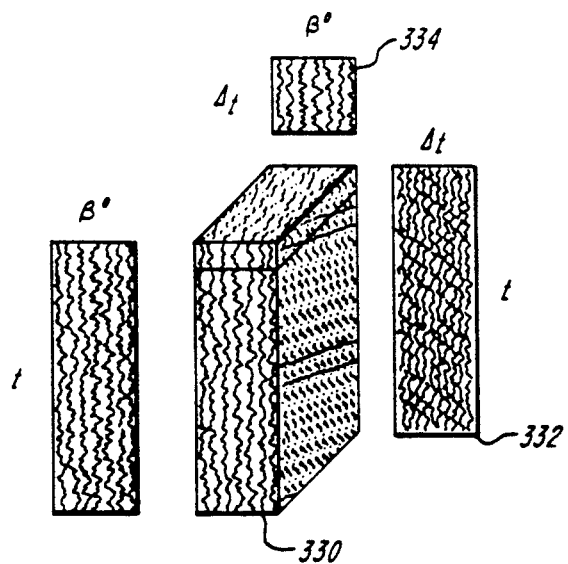
FIG. 25 is an alternate embodiment of the invention where the data cube contains input time-series data.

Referring to FIG. 25, an alternative embodiment of the invention is shown. Acoustic data is obtained from an array of hydrophones. The dimensions of the data obtained are bearing (B°), time (t), and delayed time (^t). The data cube thus contains input time-series data.

With the data arranged as shown in FIG. 25, the data may be used for high-resolution, multi-dimensional signal processing. One of the two-dimensional faces of the data cube 332 has dimensions time (t) by delayed time (^t), and is a time-delayed replica of the data. This type of matrix is referred to as a Toeplitz matrix. The right singular values describe the auto-correlation structure of the data and may be used for filtering and high-resolution frequency estimation. (See, for example, "Eigenanalysis-Based Frequency Estimation", by S. L. Marple in *Digital Spectral Analysis with Applications*, Prentice-Hall, 1987.)

A second face of the data cube 334 has dimensions bearing (B) by delayed time (t), and may be used for filtering and high-resolution estimation of the direction of arrival of multiple signals. (See, for example, "Enhanced Minimum Variance Beamforming", by N. L. Owsley, *NUSC Technical Report* 8305, 1988). The right singular vectors of this matrix describe the location of energy along the bearing dimension. The left-singular vectors describe the auto-correlation and cross-correlation of signals.

By processing all three dimensions, t, ^t and B, simultaneously, this alternate embodiment of the invention combines these two high-resolution techniques into one, unified operation which may be processed in real time.

The multi-dimensional data processing and display system of the present invention may also be used to compress data, remotely transmit the data, and then reconstitute the data at a remote location. Referring again to FIG. 6, the input data is decomposed using either singular value decomposition or eigenvector decomposition. Selected singular values and singular vectors are then transmitted. After the singular values and singular vectors are received, the input data is reconstituted from the singular values and singular vectors. The input data can be filtered or enhanced by changing the value of the singular values. In addition, the compressed data can be searched and accessed directly, without searching the entire database. This increases the efficiency of database search and retrieval operations.

The real-time multi-dimensional image processing system of the present invention is not limited to passive sonar detecting systems, but can also be used with active sonar systems. It is also useful in a variety of applications, such as, for example, a medical imaging system showing an working organ. In this alternate embodiment, the signal processing system is used to show the organ from any side, and to "travel" through the organ, showing slices at any position, or to visualize the data as a transparent data cube.

While the foregoing invention has been described with reference to a preferred embodiment, it should be understood that various modifications and alterations will occur to those skilled in the art. Such modifications and alterations are intended to fall within the scope of the appended claims. Such modifications and alterations include implementing the invention with other multivariate data, including RF data, seismic data, other communication data, and medical imaging data.

In view of the foregoing, I claim:

1. A method of analyzing signals generated by one or more signal generating objects, said method comprising:
   embedding information received from said signals into a multi-dimensional data matrix;
   separating said multi-dimensional data matrix into at least two two-dimensional data matrices;
   concatenating said two-dimensional data matrices along a common dimension to form one concatenated two-dimensional data matrix;
   decomposing said concatenated two-dimensional data matrix to obtain a compressed-matrix-form;
   modifying selected data values in said compressed-matrix-form based on a predetermined function of said data values in said compressed-matrix-form;
   enhancing said data in said concatenated two-dimensional data matrix by multiplying said concatenated two-dimensional data matrix by said modified compressed-matrix-form;
   partitioning said concatenated two-dimensional data matrix to form at least two enhanced two-dimensional data matrices; and
   arranging said enhanced two-dimensional data matrices to form an enhanced multi-dimensional data matrix.

2. The method of analyzing signals of claim 1 wherein said method further comprises scaling said multi-dimensional data in said multi-dimensional data matrix by multiplying said data at a selected location in said multi-dimensional data matrix by a data coefficient associated with said location.

3. The method of analyzing signals of claim 1 wherein said method further comprises the step of saving said compressed-matrix-form in a historical database.

4. The method of analyzing signals of claim 3 wherein said method further comprises, before decomposing said two-dimensional data matrix, the step of concatenating said compressed-matrix-form in said historical database with said concatenated two-dimensional data matrix.

5. The method of analyzing signals of claim 1 wherein said method further comprises, before modifying selected data values in said compressed-matrix-form, the step of partitioning said data in said compressed-matrix-form into subspaces.

6. The method of analyzing signals of claim 5 wherein said method further comprises saving selected subspaces of said data values in said compressed-matrix-form in a historical database.

7. The method of analyzing signals of claim 1 wherein said method further comprises the step of displaying said enhanced three-dimensional data matrix as a transparent data cube wherein said signals generated by said signal-generating objects are displayed within said transparent data cube.

8. The method of analyzing signals of claim 7 wherein said method further comprises the step of interactively rotating said transparent data cube through various angles.

9. The method of analyzing signals of claim 7 wherein said method further comprises the step of selecting two-dimensional portions of said transparent data cube and displaying said selected two-dimensional portions of said data in said three-dimensional data matrix.

10. The method of analyzing signals of claim 1 wherein said method further comprises the step of displaying portions of said enhanced three-dimensional data matrix in at least one two-dimensional display.

11. The method of analyzing signals of claim 1 wherein said information is embedded in a three-dimensional data matrix.

12. The method of analyzing signals of claim 11 wherein said three-dimensional data matrix contains data relating to the amplitude of said signals.

13. The method of analyzing signals of claim 11 wherein one dimension of said three-dimensional data matrix is bearing.

14. The method of analyzing signals of claim 11 wherein one dimension of said three-dimensional data matrix is time.

15. The method of analyzing signals of claim 11 wherein one dimension of said three-dimensional data matrix is frequency.

16. The method of analyzing signals of claim 11 wherein one dimension of said three-dimensional data matrix is depression/elevation angle.

17. The method of analyzing signals of claim 11 wherein one dimension of said three-dimensional data matrix is delayed time.

18. The method of analyzing signals of claim 12 wherein said method further comprises the step of obtaining said data relating to the amplitude of said signals from a set of hydrophones.

19. The method of analyzing signals of claim 12 wherein said method further comprises the step of obtaining said data relating to the amplitude of said signals from a beamformer.

20. The method of analyzing signals of claim 1 wherein said compressed-matrix-form further comprises singular values and singular vectors.

21. The method of analyzing signals of claim 20 wherein said modifying selected data values in said compressed-matrix-form comprises the steps of:
   ordering said singular values according to the magnitude of said singular values; and
   partitioning said singular values according to a function of said singular values.

22. The method of analyzing signals of claim 20 wherein said method further comprises the steps of:
   deriving said singular values sequentially; and
   stopping the calculation of said singular values when a function of said singular values reach a selected value.

23. The method of analyzing signals of claim 1 wherein said compressed-matrix-form further comprises eigenvalues and eigenvectors.

24. The method of analyzing signals of claim 23 wherein said method further comprises the steps of:
   deriving said eigenvalues sequentially; and
   stopping the calculation of said eigenvalues when a function of said eigenvalues reach a selected value.

25. The method of analyzing signals of claim 1 wherein said compressed-matrix-form further includes singular values and right singular vectors.

26. The method of analyzing signals of claim 1 wherein said multi-dimensional data matrix is comprised of more than three dimensions.

27. The method of analyzing signals of claim 26 wherein said multi-dimensional data matrix is comprised of five dimensions.

28. The method of analyzing signals of claim 27 wherein said five-dimensional data matrix is comprised of a two-dimensional data matrix of three-dimensional matrices.

29. A method of analyzing signals generated by one or more signal generating objects, said method comprising:
   embedding information received from said signals into a multi-dimensional data matrix;
   separating said multi-dimensional data matrix into at least two two-dimensional data matrices;
   concatenating said two-dimensional data matrices along a common dimension to form one concatenated two-dimensional data matrix;
   decomposing said concatenated two-dimensional data matrix to obtain right singular vectors and singular values;
   partitioning said right singular vectors into one or more subspaces based a function of the corresponding singular values;
   modifying selected singular values within each of said subspaces of said right singular vectors;
   enhancing said data in said concatenated two-dimensional data matrix by multiplying said two-dimensional concatenated matrix by a diagonal data matrix of said modified singular values and a matrix of said right singular vectors to generate an enhanced two-dimensional data matrix;
   partitioning said concatenated two-dimensional data matrix to form at least two enhanced two-dimensional data matrices; and
   arranging said enhanced concatenated two-dimensional data matrix to form an enhanced multi-dimensional data matrix.

30. A method of transmitting signals representing multi-dimensional data from one location to another, said multi-dimensional data being embedded with information received from one or more objects, said method comprising:
   arranging said multi-dimensional data in a multi-dimensional matrix of data elements;
   separating said multi-dimensional data matrix to a number of matrices of two-dimensional data;
   concatenating said matrices of two-dimensional data along a common dimension to form one two-dimensional data matrix;
   decomposing said two-dimensional concatenated matrix to obtain singular values and singular vectors for said matrix;
   sending said singular values and said singular vectors to a remote location;
   generating at said remote location said concatenated two-dimensional data matrix from said singular values and said singular vectors;
   arranging at said remote location said two-dimensional data matrix to form said multi-dimensional data matrix.

31. A method of transmitting signals representing multi-dimensional data from one location to another, said multi-dimensional data being embedded with information received from one or more objects, said method comprising:
   arranging said multi-dimensional data in a multi-dimensional matrix of data elements;
   separating said multi-dimensional data matrix to a number of matrices of two-dimensional data;
   concatenating said matrices of two-dimensional data along a common dimension to form one two-dimensional data matrix;
   decomposing said two-dimensional concatenated matrix to obtain singular values and right singular vectors for said matrix;
   partitioning said right singular vectors into one or more subspaces based a function of the corresponding singular values;
   modifying selected singular values within each of said subspaces of said right singular vectors;
   sending said modified singular values and said right singular vectors to a remote location;
   generating at said remote location said concatenated two-dimensional data matrix from said modified singular values and said right singular vectors;
   arranging at said remote location said two-dimensional data matrix to form said multi-dimensional data matrix.

32. A method of storing data, said method comprising:
   arranging said data into a two-dimensional data matrix;
   decomposing said two-dimensional data matrix to obtain singular values and singular vectors for said matrix;
   storing said singular values and said singular vectors;
   later retrieving said singular values and said singular vectors; and
   generating said two-dimensional data matrix from said retrieved singular values and said singular vectors.

33. A method of analyzing signals to identify selected attributes of said signals, said method comprising:
   embedding information received from said signals into a two-dimensional data matrix;
   decomposing said two-dimensional data matrix to obtain singular values and singular vectors for said matrix;
   searching said singular values and said singular vectors for information having specific features; and
   generating a new two-dimensional data matrix from said singular values and said singular vectors found during said search wherein said new two-dimensional matrix contains said information found during said search.

* * * * *